April 14, 1925.
J. S. LANE
MAIZE HEADER
Filed July 25, 1922   3 Sheets-Sheet 1
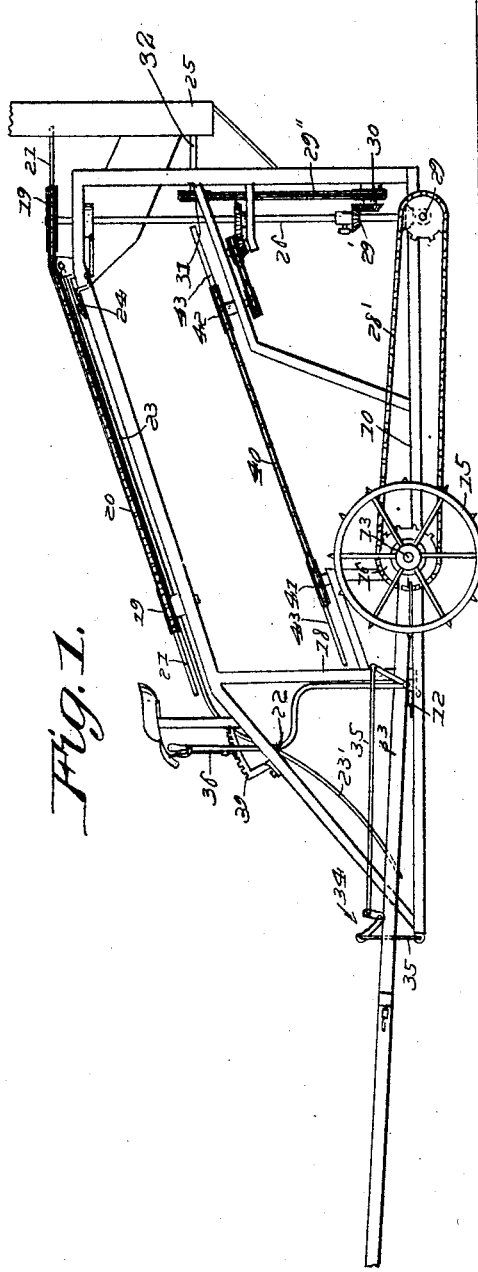
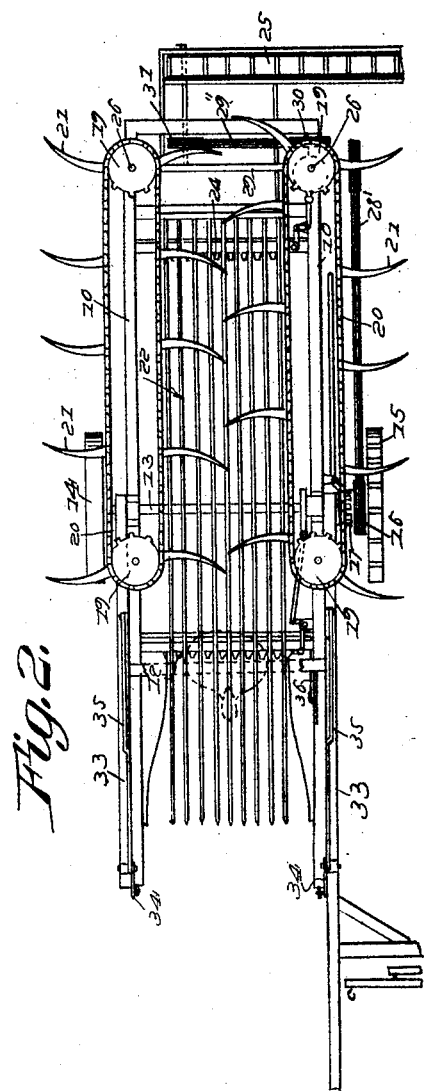
Inventor
J. S. Lane,
By
Attorney April 14, 1925. 1,533,925
J. S. LANE
MAIZE HEADER
Filed July 25, 1922 3 Sheets-Sheet 2
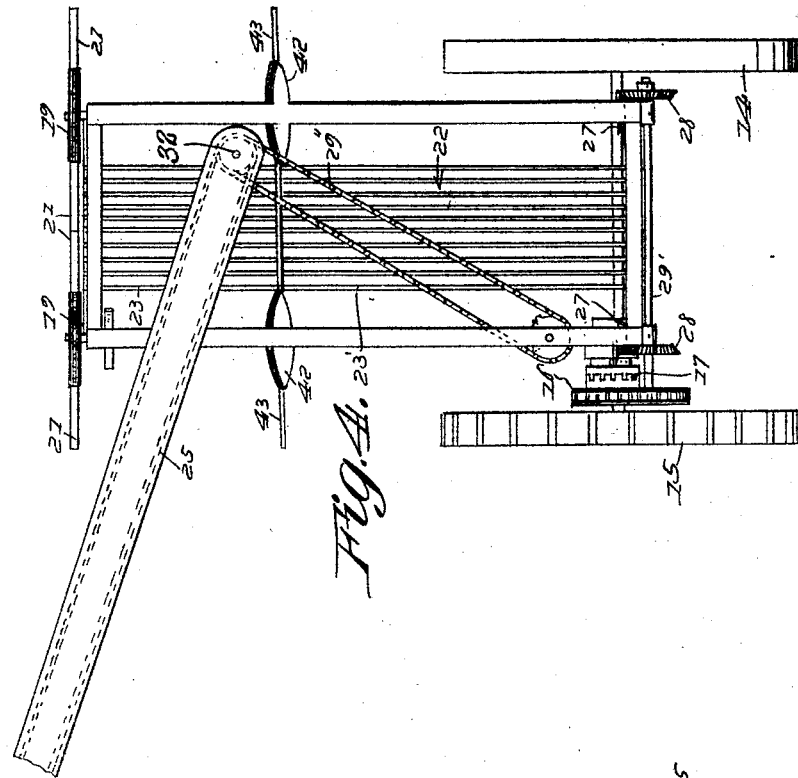
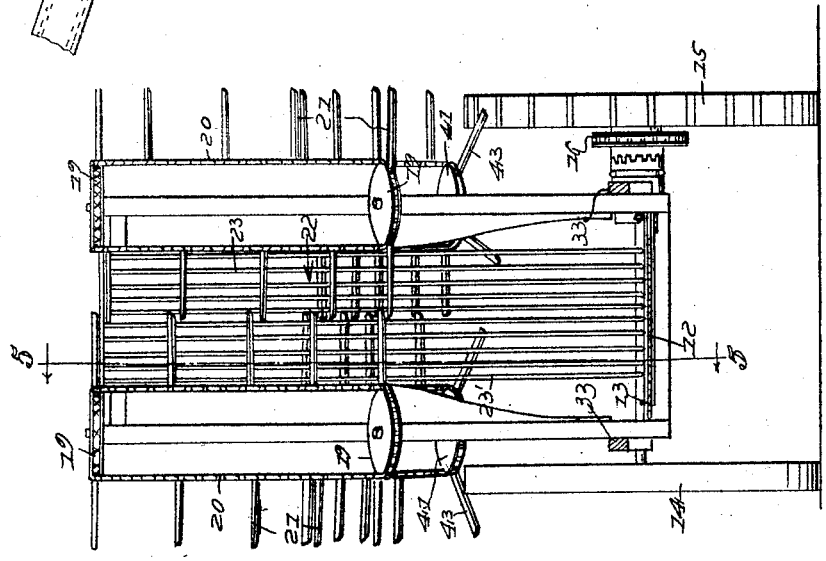
Inventor
J. S. Lane,
By
Attorney

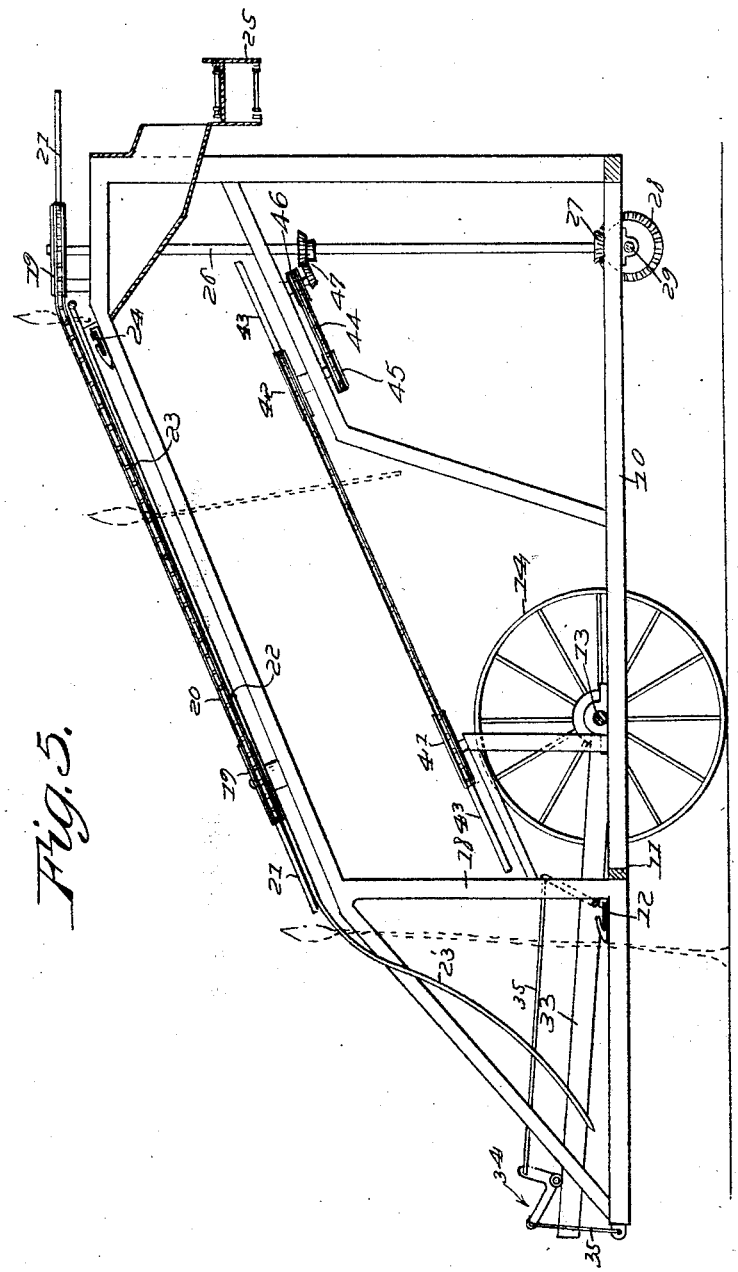

Patented Apr. 14, 1925.

1,533,925

UNITED STATES PATENT OFFICE.

JOHN S. LANE, OF ROCHESTER, TEXAS.

MAIZE HEADER.

Application filed July 25, 1922. Serial No. 577,344.

*To all whom it may concern:*

Be it known that JOHN S. LANE, a citizen of the United States of America, residing at Rochester, in the county of Haskell and State of Texas, has invented new and useful Improvements in Maize Headers, of which the following is a specification.

The object of the invention is to provide comparatively simple and efficient means for economically handling maize and similar grain in the operation of heading the same so that all of the grain heads may be harvested, regardless of the height of the stalks which vary to a considerable extent in growth and to sever the heads from the stalks at a uniform distance from the former so as to minimize the amount of straw which accompanies the heads into the separating or cleaning apparatus; and with this object in view the invention consists in a construction and combination of parts of which a preferred embodiment is shown in the accompanying drawings, wherein:

Figure 1 is a side view,

Figure 2 is a plan view, and

Figure 3 is a front end view of a maize harvesting mechanism embodying the invention.

Figure 4 is a rear view.

Figure 5 is a longitudinal sectional view on the line 5—5 of Figure 3.

Essentially the machine consists of a longitudinally open base frame having side bars 10 which are connected at an intermediate point by a transverse brace 11 above which is arranged a preliminary or forward cutter bar 12 designed to sever the stalks from the stubble and at a uniform distance from the surface of the ground, the machine being drawn by a pair of draft animals connected with the front ends respectively of the side bars. The machine is adapted to work on opposite sides of the row of maize which is being harvested, and is provided with carrying mechanism supported by the main frame, header cutting mechanism, and elevating means for conveying the severed heads to the stubble side of the machine for discharge into a suitable receptacle or vehicle operating at the side of the harvester. The machine is preferably carried in a substantially balanced condition upon a central transverse axle 13 upon which are mounted the grain wheel 14 and the power or driving wheel 15, to the latter of which may be connected a sprocket wheel 16 through the agency of a manually actuable clutch 17.

Supported by standards 18 rising from the side bars of the main frame are sprocket wheels 19 traversed by conveyor belts or chains 20 carrying arms 21 which extend transversely of the space between the planes of the side bars of the frame into intermediate terminal overlapping relation substantially in contact with the upper surface of a grill 22 consisting of longitudinally disposed guide rods 23 extending substantially throughout the length of the frame with depending front ends forming lifting and guiding fingers 23′ adapted to engage the stalks of the maize below the heads thereof regardless of the shortness of the stems to properly position the stalks as they approach the preliminary or foremost cutter mechanism 12 which as above noted serves to sever the stalks near and at a uniform distance from the surface of the ground. The stalks from the point of severance are supported by the grille with the heads resting on the guide rods regardless of the length of the stems and are conveyed rearwardly on the grille by means of the conveyor arms until they reach the header knife or cutter mechanism 24 where the heads are detached from the stalks, dropping the latter to the ground and depositing the heads upon a transverse elevator 25 by which they are conveyed laterally of the path of the machine for deposit in a suitable recepatcle or vehicle.

In the construction illustrated the rear sprocket wheels 19 are provided with vertical spindles 26 carrying at their lower ends bevel pinions 27 engaged by bevel gears 28 on a transverse shaft 29 driven from the sprocket 16 by a chain 28′ while the elevator belt may similarly be driven from the drive wheel through a chain 29″ traversing sprockets 30 and 31 of which the latter is carried by the drive shaft 32 of the elevator. The sprocket wheel 30 is driven from one of the vertical spindles 26 through a bevel gear couple 29′.

In order to provide for the adjustment of the plane of operation of the preliminary or foremost cutter which for convenience may be termed a stalk cutter as distinguished from the rear elevated head cutter, the draft mechanism of the apparatus may include tongues 33 extending parallel with the front ends of the side bars or beams of the frame and mounted upon the axle, and tilting means 34 connected with the front ends of said bars or beams and having connection by a rod 35 with the hand lever 36 which is provided with a latch for engagement with a toothed segment 39.

Also as indicated it is preferable to dispose the forward conveyor sprockets 19 in a depressed position with relation to the rear sprockets 19 so as to arrange the guide rods forming the grille at an upward inclination as they approach their rear ends, said guide rods having an abrupt drop at or about the transverse plane of the front sprockets 19 to provide the raising or gathering fingers 23′ hereinabove described and serving to raise the stalks so as to properly position the heads of the maize upon the grille for conveyance to the rear as indicated.

It will be obvious that with the mechanism indicated while a practically uniform severance of the grain stalks from the stubble is effected there is also secured a uniform severance of the heads from the straw or body portions of the stalk to minimize the amount of straw carried with the heads, regardless of the relatively wide range of difference in the lengths or heighths of the stalks in their growth and hence the difference in the horizontal planes of the heads as the grain stands in the field; and in connection with this economical handling of the stalks there is provided a mechanism whereby all of the maize heads may be harvested regardless of the heighth of the stalks to minimize the waste which is incurred when the heading cutter operates upon the standing grain, and in connection with which there is ordinarily no means for uniformly positioning the heads with relation to the header knife or cutting mechanism.

In order to carry the lower ends of the stalks rearwardly, after their separation from the stubble by the stalk cutting mechanism, to correspond with the movement of the heads by the conveyor 20 is a supplemental conveyor consisting of chains 40 traversing front and rear sprocket wheels 41 and 42 and also provided with fingers 43 similar to those of the conveyor 20, the rear sprocket wheels 42 receiving rotary motion from the upright shafts 26 by means of a supplemental chain 44 traversing sprocket wheels 45 and 46 of which the former are carried on the shafts of the sprocket wheel 42 and the latter operatively connected with the vertical spindles 26 by bevel gear couples 47. Preferably the supplemental conveyor travels at a slightly higher rate of speed than the head conveyor 20 so as to afford a clearance at the front of the machine and obviate any tendency of the stalks to become crowded or jammed in their movement toward the rear of the machine where, upon the severance of the heads, the stalks are dropped to the ground.

Having described the invention, what is claimed as new and useful is:—

1. A harvester for maize and similar products having a preliminary or stalk cutting mechanism for severing the stalks from the stubble at a uniform distance from the plane of the ground surface, means for engaging the grain heads to support the same with the attached stalks, means for conveying the heads rearwardly in this stalk supporting position and in a common plane, and a head cutter mechanism for severing the stalks at a uniform distance from the heads, the means for engaging and guiding the heads in a stalk supporting position consisting of a grille having longitudinally disposed rods forming spaces for the reception of the stems or stalks.

2. A harvester for maize and similar products having a preliminary or stalk cutting mechanism for severing the stalks from the stubble at a uniform distance from the plane of the ground surface, means for engaging the grain heads to support the same with the attached stalks, means for conveying the heads rearwardly in this stalk supporting position and in a common plane, and a head cutter mechanism for severing the stalks at a uniform distance from the heads, the means for engaging and guiding the heads in a stalk supporting position consisting of a grille having longitudinally disposed rods forming spaces for the reception of the stems or stalks and provided at their front ends with downwardly directed guiding fingers.

3. A harvester for maize and similar products having a preliminary or stalk cutting mechanism for severing the stalks from the stubble at a uniform distance from the plane of the ground surface, means for engaging the grain heads to support the same with the attached stalks, means for conveying the heads rearwardly in this stalk supporting position and in a common plane, and a head cutter mechanism for severing the stalks at a uniform distance from the heads, the conveying means consisting of endless carriers provided with inwardly directed arms for traversing the surface of the head engaging and carrying means.

4. A harvester for maize and similar products having a preliminary or stalk cutting mechanism for severing the stalks from the stubble at a uniform distance from the plane of the ground surface, means for engaging the grain heads to support the same with the attached stalks, means for conveying the heads rearwardly in this stalk supporting position and in a common plane, and a head cutter mechanism for severing the stalks at a uniform distance from the heads, the conveying means consisting of endless carriers provided with inwardly directed arms for traversing the surface of the head engaging and carrying means, said arms being arranged in terminal overlapping relation.

5. A harvester for maize and similar products having a preliminary or stalk cutting mechanism for severing the stalks from the stubble at a uniform distance from the plane of the ground surface, means for engaging the grain heads to support the same with the attached stalks, means for conveying the heads rearwardly in this stalk supporting position and in a common plane, and a head cutter mechanism for severing the stalks at a uniform distance from the heads, the conveying means consisting of endless carriers provided with inwardly directed arms for traversing the surface of the head engaging and carrying means, and supplemental carriers located below the plane of the first-mentioned carriers for engaging the pendent stalks of the grain.

6. A harvester for maize and similar products having a preliminary or stalk cutting mechanism for severing the stalks from the stubble at a uniform distance from the plane of the ground surface, means for engaging and guiding the heads in a stalk supporting position and consisting of a grille having forwardly inclined longitudinally disposed rods defining spaces for the reception of the stems or stalks, a head cutter mechanism disposed at the rear upper end of the grille for severing the stalks at a uniform distance from the head, and means for conveying the heads rearwardly up the inclined grille.

7. A harvester for maize and similar products having a preliminary or stalk cutting mechanism for severing the stalks from the stubble at a uniform distance from the plane of the ground surface, means for engaging and guiding the heads in a stalk supporting position and consisting of a grille having forwardly inclined longitudinally disposed rods defining spaces for the reception of the stems or stalks, a head cutter mechanism disposed at the rear upper end of the grille for severing the stalks at a uniform distance from the head, and inclined conveyor belts disposed at opposite sides of the grille and provided with overlapping arms traversing the upper surface of the grille.

8. A harvester for maize and similar products having a preliminary or stalk cutting mechanism for severing the stalks from the stubble at a uniform distance from the plane of the ground surface, means for engaging and guiding the heads in a stalk supporting position and consisting of a grille having forwardly inclined longitudinally disposed rods defining spaces for the reception of the stems or stalks, a head cutter mechanism disposed at the rear upper end of the grille for severing the stalks at a uniform distance from the head, inclined conveyor belts disposed at opposite sides of the grille and provided with overlapping arms traversing the upper surface of the grille, and supplemental conveyor belts disposed below and paralleling the first said conveyor belts and similarly provided with overlapping arms.

In testimony whereof he affixes his signature.

JOHN S. LANE.